United States Patent [19]

Gazzoli et al.

[11] Patent Number: 4,538,028

[45] Date of Patent: Aug. 27, 1985

[54] APPARATUS FOR USE WITH KEY TELEPHONE SYSTEM WITH WIRELESS TELEPHONE DEVICE

[75] Inventors: Italo Gazzoli, Clearwater; Frank Keller, Tampa, both of Fla.

[73] Assignee: General Telephone of Florida, Tampa, Fla.

[21] Appl. No.: 538,073

[22] Filed: Sep. 30, 1983

[51] Int. Cl.³ .......................... H04Q 7/04; H04M 1/72
[52] U.S. Cl. ................................ 179/2 EA; 179/99 R; 179/99 LS
[58] Field of Search ................. 179/2 E, 2 EA, 2 EB, 179/99 H, 99 LS, 99 LC, 99 R, 99 P

[56] References Cited

U.S. PATENT DOCUMENTS

| | | | |
|---|---|---|---|
| 3,909,554 | 9/1975 | Reed | 179/99 H X |
| 3,971,898 | 7/1976 | Hijikata et al. | 179/99 LS |
| 4,133,985 | 1/1979 | Rasmussen et al. | 179/99 H |
| 4,311,880 | 1/1982 | Balzer et al. | 179/99 H |
| 4,456,793 | 6/1984 | Baker et al. | 179/99 R |

*Primary Examiner*—Gene Z. Rubinson
*Assistant Examiner*—W. J. Brady

[57] ABSTRACT

A key telephone system has output circuits connectable to a plurality of outside lines which are connected to a central exchange. A wireless telephone having a base unit with first and second output terminals and a separable cooperating handset unit having a manually operable number entry device is associated with the system. These units have cooperating radio transmitters and receivers which permit wireless communication links to be established between the units. A cordless telephone - key telephone interconnection interface has first and second output terminals respectively connected to the first and second output terminals of the base unit and output terminals connected to the output circuits of the key system. The interface establishes a plurality of calling numbers for the outside lines to be employed by a user of the handset unit. A different number is associated with each different outside line whereby when the system output circuits are connected to the exchange and the wireless links are established between the units, the user, by entering any one of the numbers into the device in the handset unit, can establish a communication channel between the outside line corresponding to the number entered and the handset unit.

10 Claims, 7 Drawing Figures

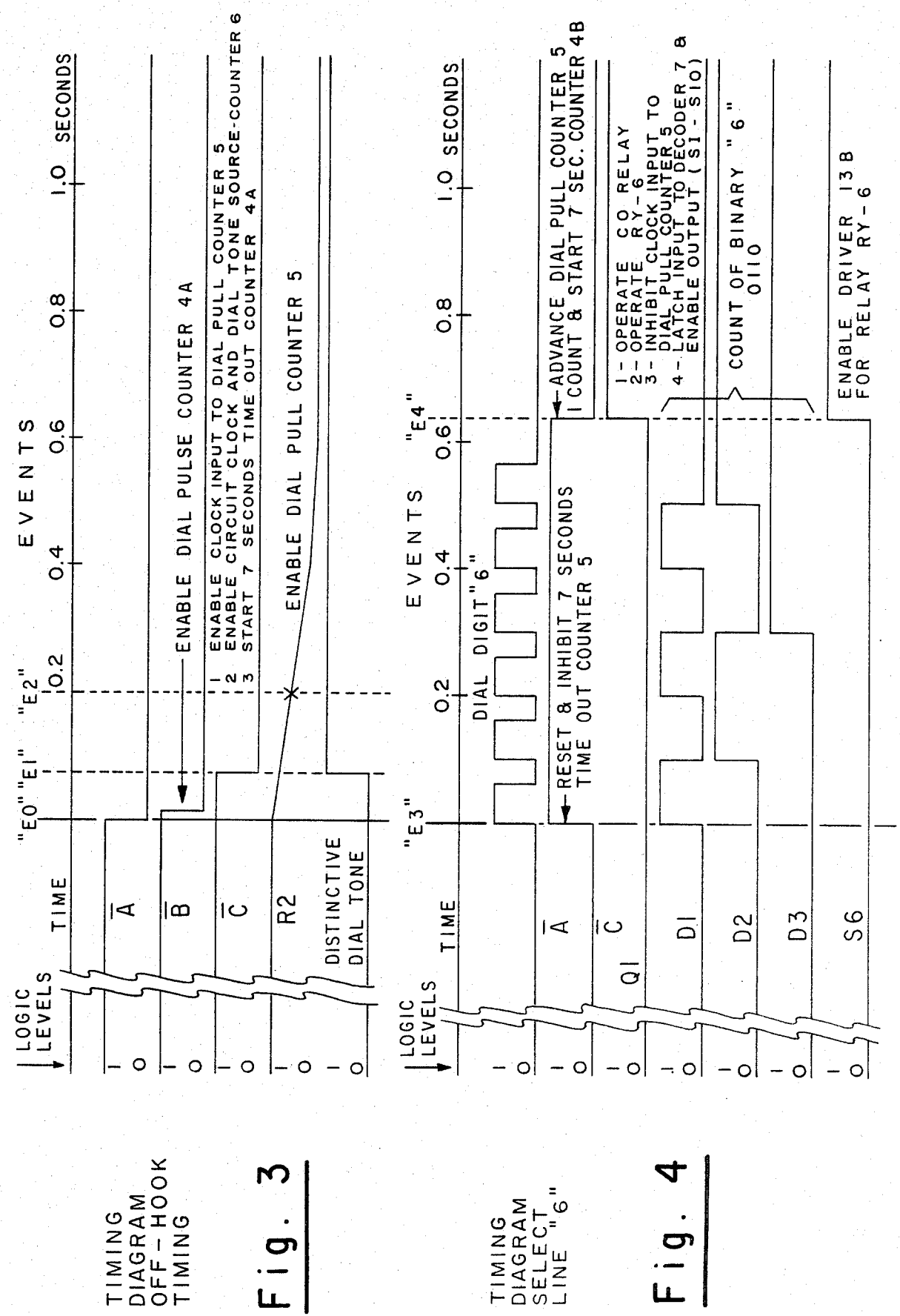

TIMING DIAGRAM
DIAL "1" HOLD TIMING

TIMING DIAGRAM
DISCONNECT TIMING

APPARATUS FOR USE WITH KEY TELEPHONE SYSTEM WITH WIRELESS TELEPHONE DEVICE

BACKGROUND OF THE INVENTION

Key telephone systems occupy a market between one line telephone instruments and private branch exchanges. Typically, a key telephone system utilizes a small number of telephone instruments connected to a small control unit which in turn is connected through a small number of outside lines to a central office. Each instrument has a rotary dial or push button key pad together with a plurality of push buttons each of which is associated with a corresponding one of the outside lines and contains a lamp which is lit when the corresponding line is busy and is dark when the corresponding line is free. A user can be connected to a free outside line by depressing any button having a dark lamp and can then place a call by "dialing" the desired number. Other variations of this system can utilize additional lamp carrying buttons for establishing a connection between different telephone instruments connected to the same key telephone system.

Wireless telephone devices have recently come into use. These devices comprise a stationary base unit connected to a single outside line and a separable cooperating handset unit with a rotary dial or key pad. These units are provided with cooperating transmitters and receivers whereby a user can move to the handset unit from place to place while the base unit remains stationary and yet the user can receive and orginate calls using the handset unit in the same manner as if the handset unit were connected by wire conductor to the base unit in conventional manner.

This invention is directed toward an arrangement wherein a wireless telephone device can be connected to a key system via a communications interface in such manner that a user of the wireless device can use the handset to perform all the functions now performed by a stationary key telephone instrument and yet retain the freedom of motion that a wireless telephone device provides.

SUMMARY OF THE INVENTION

In accordance with the principles of the invention, a wireless telephone device is employed. The device has a base unit with first and second output terminals and a separable cooperating handset unit having a manually operable number entry device, said units having cooperating transmitters and receivers which permit wireless communication links to be established between said units.

Employed in combination with the telephone is a key telephone system having output circuits which are connected to a plurality of outside lines which are connected to a central exchange.

The telephone and key system are interconnected by a wireless telephone - key telephone interface or interconnection means, which has first and second input terminals connected to the first and second output terminal of the base unit and also has output terminals connected to the output circuits of the key system. This means establishes a plurality of calling numbers for said outside lines to be used by a user of the handset unit, thereby being a different number associated with each different outside line. As a consequence, when said system output circuits are connected to said exchange and said wireless links are established between said units, said user, by entering any one of said numbers into the device in the handset unit, can establish a communication channel between the outside line corresponding to the number entered and the handset unit.

If desired, one particular outside line connection can be used for calls to be made between different telephones within the key system itself.

The key telephone system can be provided with lamp circuits adapted for connection to a like plurality of signal lamps, which are visually accessible in the vicinity of the cordless telephone, so that each lamp is associated with a corresponding outside line whereby when said output circuits are connected to said outside lines and said lamp controlling circuits are connected to said lamps, each lamp is lit when its corresponding outside line is busy and is dark when its corresponding outside line is free. This arrangement can be employed to prevent the user from attempting to place an outgoing call on an outside line that is already busy.

BRIEF DESCRIPTION OF THE DRAWINGS

FIG. 3 is a timing diagram illustrating the "off-hook" condition.

FIG. 4 is a timing diagram illustrating the line select operation.

DETAILED DESCRIPTION OF PREFERRED EMBODIMENTS

Figure 1:
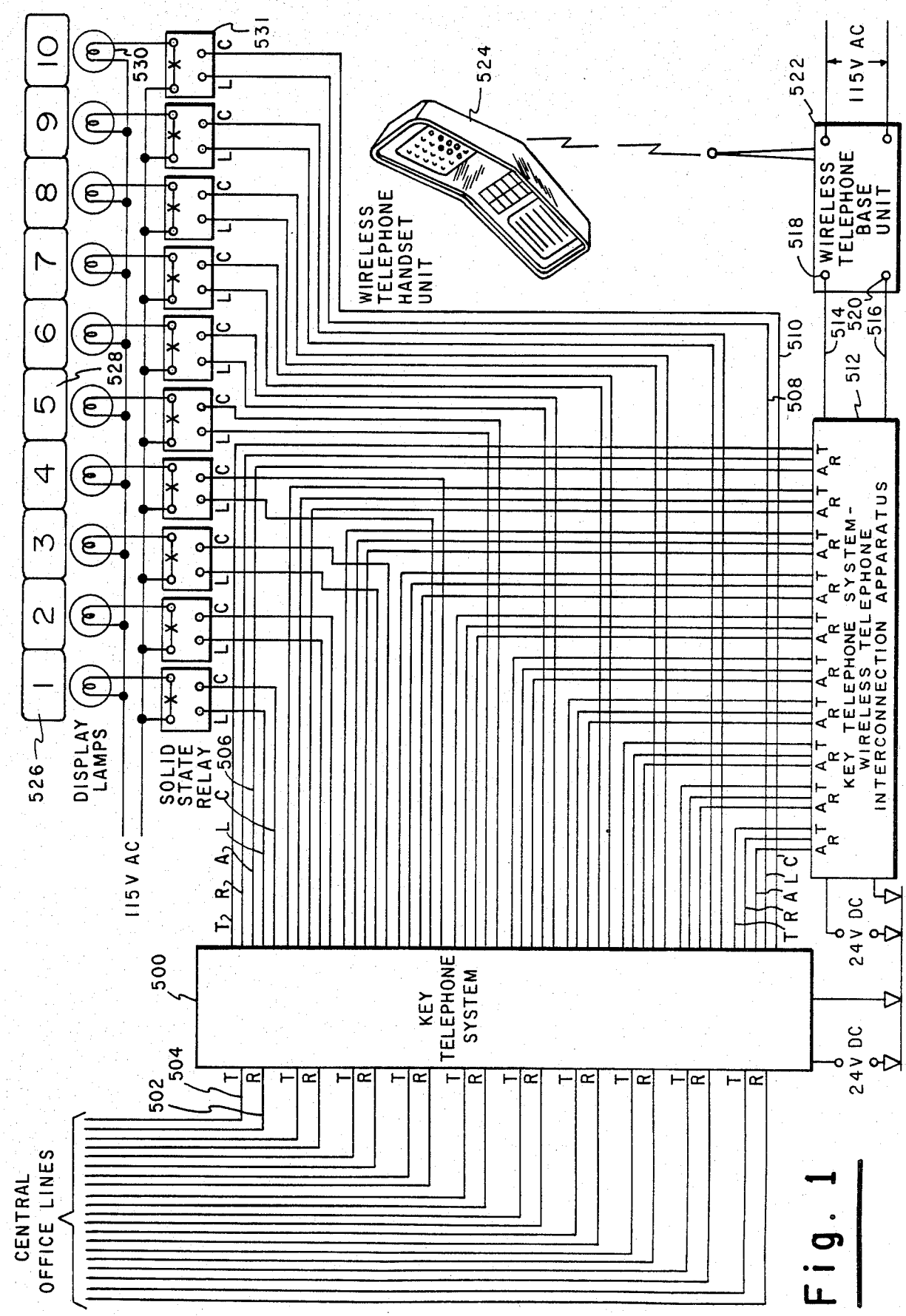
FIG. 1 is a block diagram of a telephone system incorporating the invention.

Referring first to FIG. 1, a conventional key telephone system 500 is connected to a plurality of central office lines. Each line consists of two conductors 502 and 504 which are conventionally identified as ring and tip conductors respectively. The system has a like plurality of output circuits. Each output circuit includes conductors 502 and 504 of the corresponding central office line, together with conductor 506, the conductor used for hold operations and conventionally identified as conductor A, and conductors 508 and 510. Conductors 508 and 510 are used to actuate the lamp in the push button which is associated with the corresponding central office line and which is found in each of the key telephone instruments. Conductor 508 is conventionally designed as an L conductor; there is a different one of these conductors for each lamp. Conductor 510 is a conductor conventionally designated as a C conductor and is connected in common to all lamps.

The conducors 502, 504 and 506 of each output circuit of system 500 are connected to the key telephone system - wireless telephone interconnection apparatus 512 and constitute output terminals for the apparatus 512 as will be described in more detail below. Apparatus 512 has two input conductors 514 and 516 which are connected to the tip and ring terminals 518 and 520 respectively of the wireless telephone base unit 522. Unit 522 cooperates with handset unit 524. Typically these units have cooperating radio transmitters and receivers which permit wireless communication links to be established between the units. However other types of wireless telephone arrangements can be used, as for example, arrangements using infrared rather than radio frequencies.

Apparatus 512 establishes a plurality of calling numbers for the outside (central office) lines to be employed by a user of the handset unit 524. A different number is associated with each different outside line whereby when the system output circuits are connected to the central office and wireless links are established between the units, the user, by entering any one of the numbers into the key pad or dial on the handset unit, can establish a communication channel between the outside line corresponding to the number entered and the handset unit.

In order for the user of the handset to see which outside lines are in use or are free or are being held, a vertical column 526 of numbered translucent cells or boxes 528 is disposed visually accessible to the user. The numbers correspond to the numbers used for the outside lines in the key system. Each box contains a separate lamp 530 which is connected in circuit with the corresponding lamps in the corresponding push buttons of each key telephone and provides the same visual information. However, the lamps in the key telephones are low voltage and lamps 530 operate on 115 volt 60 hertz single phase power. Hence each box 528 contains a separate solid state relay 531 connected to the L and C conductors 508 and 510 of the corresponding output circuit of the key telephone system as well as to the lamp 30 and alternating current source. The relay is controlled by conductors 508 and 510 so that when the key telephone lamp is dark, indicating that the line is free, or is flashing indicating that the line is held or is ringing, or is lit indicating that the line is in use, the corresponding lamp in the box will be dark, flashing or lit.

The circuit diagram FIG. 2 employs certain electronic components whose individual functions will be described separately before the operation of the circuit can be explained with reference to the timing diagrams of FIGS. 3-6. The first component has elements 1A, 1B, 1C and 1D and is a NAND Schmitt trigger which performs the following functions: it repeats pulses to dial up counter 4A; it generates the delayed off hook condition; it generates a pulse of the duration of any initial digit sequence to the dial pulse counter 5; and it resets the counter and tone generator of the main clock counter 6.

The different letter designations of all of the components described in this section are used to identify different elements on a common integrated circuit chip.

The second component has elements 2A, 2B, 2C and 2D and is an OR gate which performs the following functions: it gates the off hook condition from the first component, the NAND Schmitt trigger, to the dial up counter 4A and the dial pulse counter 5; it generates a one shot pulse to the NAND buffer driver 10B which controls the HR relay; it resets the dial up counter 4A and the dial pulse counter 5; and it gates an output of the dial pulse counter 5 to stop the main clock counter 6.

The third component has elements 3B, 3C and 3D and is a "NOR" gate which performs the following functions; it enables or inhibits the tone generator portion of main clock counter 6; it activates the strobe and inhibit leads to the line select latch decoder 7; and it provides a buffer for dial tone between the tone generator portion of main clock counter 6 and the tip and ring terminals 518 and 520 of base unit 522.

The fourth component is dial up counter 4A and converts dial pulses from the base unit 522 to binary pulses supplied to the line select latch decoder 7.

The fourth component also includes time out counter 4B which counts the interdigital time (seven seconds) after which the selected line will be placed automatically on hold. Counters 4A and 4B are different halves of one integrated circuit chip.

The fifth component is dial pulse counter 5 and performs the following functions: it counts a long pulse for the duration of the first pulse sequence; it feeds an output through element 2A to its own clock input to stop the count after completion of the first digit sequence; through buffer driver 10A it operates the CO relay; through element 3D it inhibits the line select latch decoder 7 and also strobes the first digit just dialed into the line select latch decoder 7.

The sixth component is main clock counter 6 which together with external circuit resistors and capacitors forms an oscillator to generate local dial tone and also generates a pulse to be counted by time out counter 4B to establish the seven seconds of interdigital time.

The seventh component is line select latch decoder 7 which decodes the pulses corresponding to the number dialed to operate through the appropriate buffer driver the particular relay RY that will seize the line selected. The buffer drivers are identified at 11A, 11B, 12A, 12B, 13A, 13B, 14A, 14B, 15A, and 15B, each being connected to a different one of the ten RY relays.

The eighth component is the electro optical device 8 that provides line isolation and repeats off hook and dealing pulses to the NAND Schmitt trigger.

The ninth component has elements 9A and 9B and is an AND gate which combines outputs from the dial pulse counter 5 and the time out counter 4B with the output at point A, when digit one is dialed after seven seconds interdigital time, to generate a pulse to the one shot trigger or multivibrator shown in dotted line and identified at 600.

The operation of the curcuit of FIG. 2 will now be described with respect to the timing diagrams of FIGS. 3-6.

CIRCUIT OPERATION

On Hook

Figure 2A:
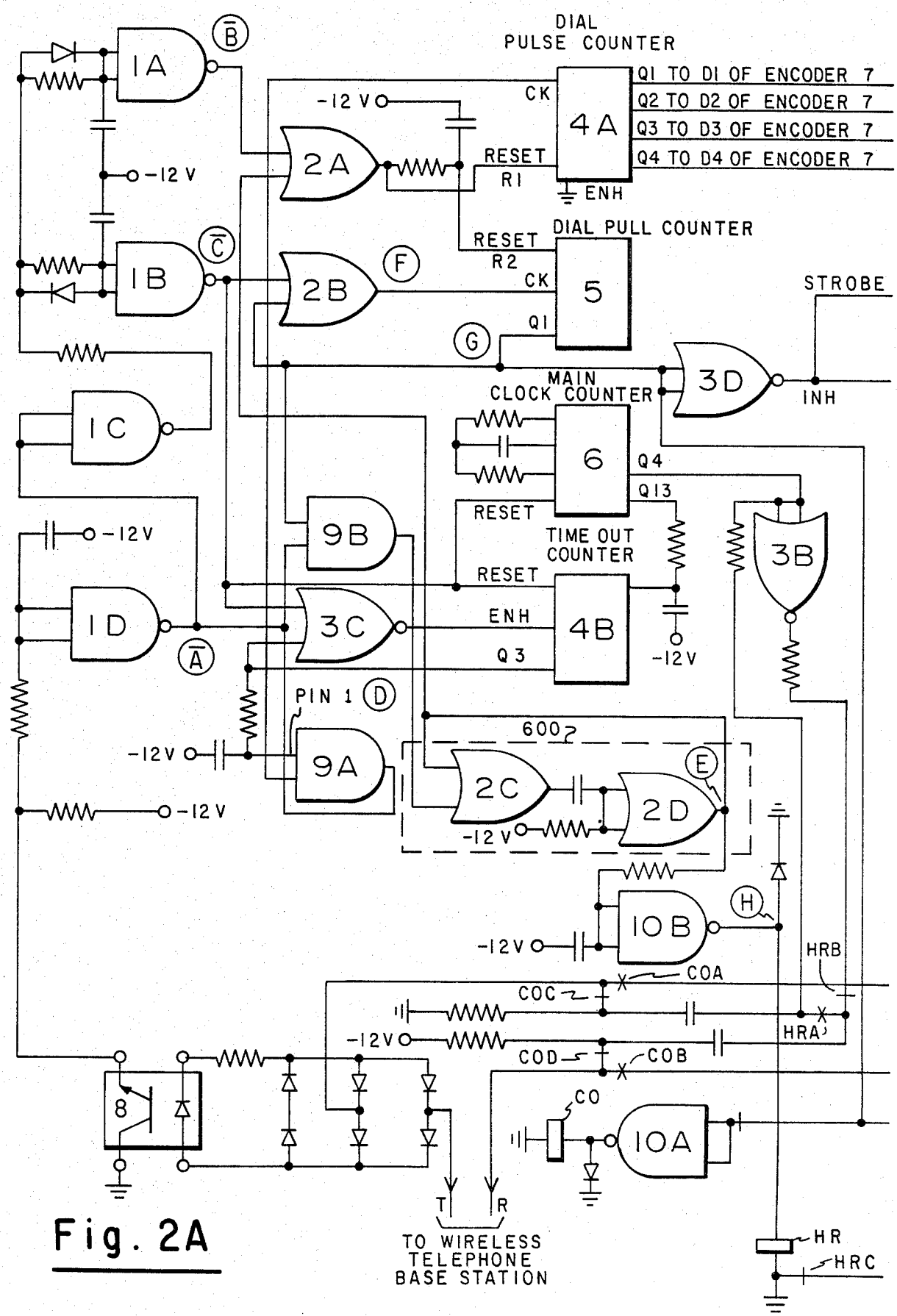
FIGS. 2A and 2B are a circuit diagram of the interface unit shown in FIG. 1.
Figure 2B:
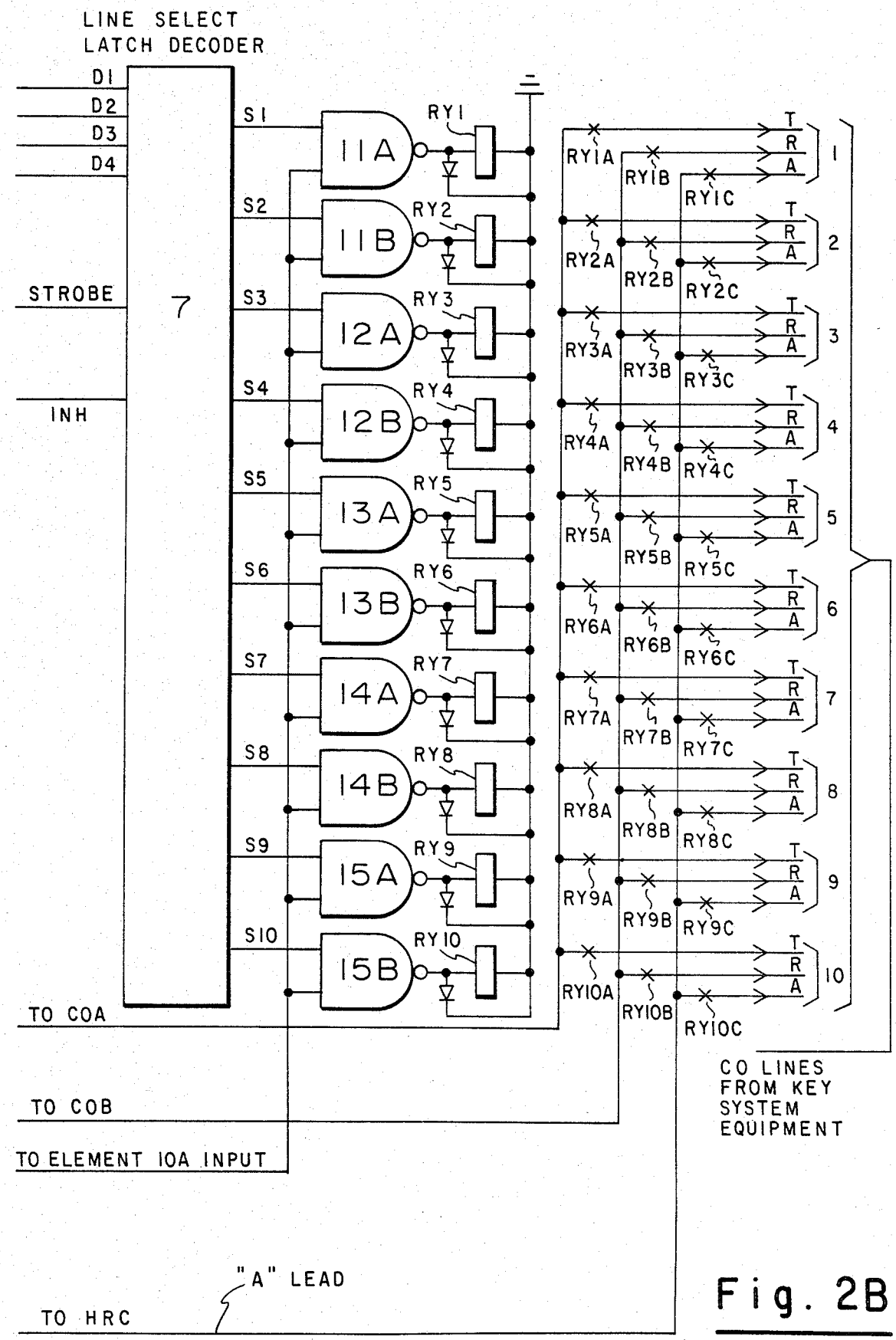

Referencing the schematic diagram, FIG. 2, logic points A, B, and C are at logic one. The dial up counter 4A, the dial pulse counter 5, the time out counter 4B and the main clock counter 6 are reset and idle. The line select latch decoder 7 is in the inhibit mode (all outputs are at logic zero). All RY relays, RY1-RY10, are de-energized. A pulse potential is applied to ring conductor 520 while ground potential is applied to tip conductor 518. These conductors 520 and 518 are not interconnected.

Off Hook

When the handset goes off-hook, a circuit is completed between conductors 520 and 518. Current is suitably limited by the resistors and the protection diodes of the opto-isolator circuit 8. The transistor side of the opto-isolator 8 has a suitable load resistor and a resistance-capacitence network to filter noise from the pulsing signals. The off hook condition is identified as Event EO, in the timing diagram of FIG. 3. Logic points A and B rise from logic one to logic zero, and the dial pulse counter 4A is enabled. After a delay of seventy milliseconds produced by delay network R9 and C3, at Event E1, point C goes to logic zero. Although the dial pulse counter will normally advance on the negative transistion of point C, its reset terminal remains at logic one, because of action of delay network R6 and C11. At Event E1, point C goes to logic zero, the main clock counter 6 is enabled, the time out counter 4B is enabled, and distinctive dial tone differing from the central office dial tone is produced in the handset unit, indicating that the user can select a line. At Event E2, the logic level on the reset leads of the dial pulse counter 5 has decayed sufficiently to cause this counter 5 to be enabled. Line selection can now take place.

Line Selection

Referring to the timing diagram of FIG. 4. at Event E3, the digit six is dialed to select line #6. As shown at logic point A, six dial pulses are present at the clock input of the dial pulse counter 4A. The output of this counter 4A is applied to the leads D1, D2, D3, and D4 of the line select latch decoder 7. The logic levels for leads D1, D2 and D3 are as shown. Lead D4 is maintained at logic zero and will not change unless any of digits eight, nine or zero are dialed. At Event E4, logic point C changes from logic one to logic zero, and the dial pulse counter 5 is advanced one count. The logic one now present on output Q1 is used to inhibit its clock input through gate 2B. The Q1 output of counter 5 will remain at logic one until this counter is reset.

The inverted output, which is at logic zero, from Q1 of the dial pulse counter 5 is used to latch the D1, D2, D3, and D4 input states in the decoder 7, and also enables the outputs of the decoder 7. The normal Q1 output of counter 5 which is at logic one, enables the CO relay, and connects conductors 520 and 518 to the common busses of the line select relays (RY1-10). Since the digit six has been dialed, relay RY6 is enabled and connects the busses to line #6 of the key system. The handset is now metallically connected to the line and central office dial tone will be heard. Dialing must now process within seven seconds and interdigital dialing pauses held to less than seven seconds or else the circuit will cause the key system line to be placed on hold. The "hold" operation is described in more detail in the next section. If the line was placed on hold inadvertently, the originator must redial that line select digit to seize the line and then momentarily go on-hook to release the line.

Hold

Figure 5:
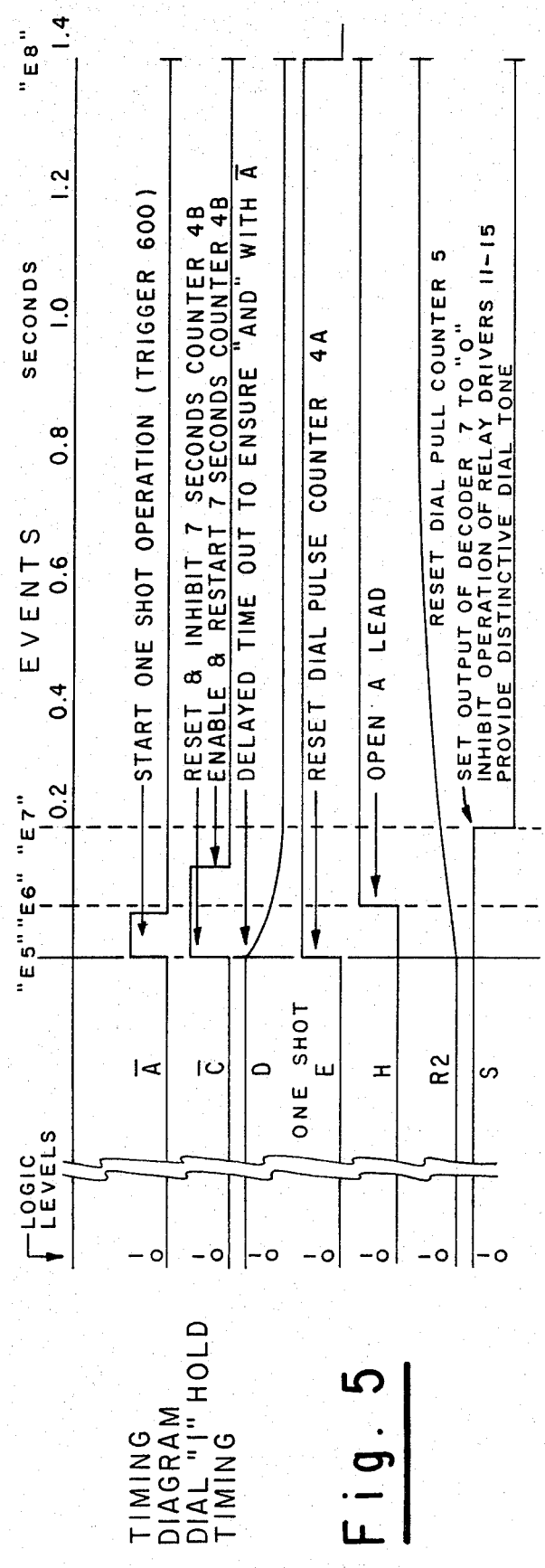
FIG. 5 is a timing diagram illustrating the line hold operation.

Referring to the timing diagram of FIG. 5, when digit one is dialed, Event E5, point A rises to logic one and enables the one-shot multivibrator 600, as shown at point E also, at Event E5, the rise at point E of logic zero to logic one resets the dial pulse counter 4A and the change in logic level at C resets and inhibits the time out counter 4B. At Event E6, after a delay of seventy milliseconds produced by delay network R17 and C1, the HR relay is energized during the period of enablement of the multivibrator to open the conductor 506 to the key system. This results in the key system line going on hold condition. More particularly, the conductor 506, the A.conductor, controls relays in the key telephone system. When this conductor is disconnected from the key system relays, the hold condition is established; when the conductor is connected, the hold condition is disabled. At Event E7, the dial pulse counter is reset, which in turn inhibits the output of the decoder 7, releases the CO relay, thereby removing conductors 520 and 518 from the common busses of the line select relays, and also inhibits the line select relay drivers. At Event E8, the one-shot's operation is complete, the dial pulse counter is enabled, and after a seventy millisecond delay, the HR relay is energized, permitting the A lead to be used again, and after an additional delay of two hundred milliseconds, the dial pulse counter is enabled. The system is now ready for a user to dial a digit select another outgoing line while the original line is now on hold.

Further system operation, except for disconnect, will be a repetition of what has just be described. It should be noted that at Event E5, any dialed digit would have put the call on hold due to the length of the one-shot operation. Also, any dialing action after the line has been selected, and after the time out counter has operated will create a hold condition, whether or not dialing has been completed. When this happens, the line that was inadvertently put on hold must be again selected, so it can be disconnected and reseized.

Disconnect

Figure 6:
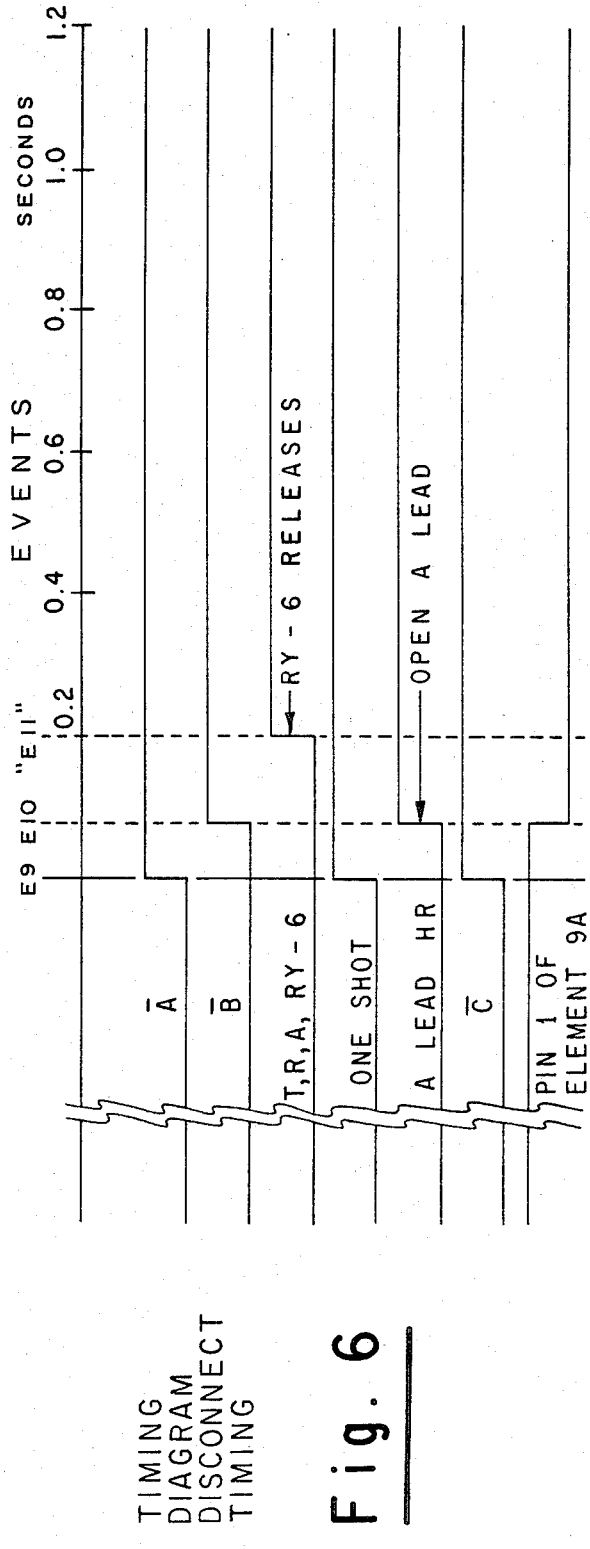
FIG. 6 is a timing diagram illustrating the line disconnect operation.

Referring to the timing diagram of FIG. 6, at Event E9, when handset is placed on-hook, the connection between tip and ring conductors 518 and 520 is broken. The point C logic level rises to logic one, starting the sequence that disables the main clock counter and resets counter 4B. At Event E10, the dial pulse counter is reset. This action causes the decoder 7 to be reset, releasing the CO relay, inhibiting the line select relay drivers and releasing the line select relay.

What is claimed is:

1. In combination with a key telephone system having output circuits connectable to a plurality of outside lines which are connected to a central exchange, said output circuits including lamp controlling circuits adapted for connection to a like plurality of signal lamps, each lamp being associated with a corresponding outside line whereby when said output circuits are connected to said outside lines and said lamp controlling circuits are connected to said lamps, each lamp is lit when its corresponding outside line is busy and is dark when its corresponding outside line is free:

a wireless telephone device having a base unit with first and second output terminals and a separable cooperating handset unit having a manually operable number entry device, said units having cooperating transmitters and receivers which permit wireless communication links to be established between said units;

said plurality of signal lamps being connected to said lamp controlling circuits, said lamps being visually accessible in the vicinity of said cordless telephone; and cordless telephone - key telephone interconnection means having first and second input terminals respectively connected to the first and second output terminals of the base unit and having output terminals connected to the output circuits of the key system, said means establishing a plurality of calling numbers for said outside lines to be used by a user of the handset unit, there being a different number associated with each different outside line whereby when said system output circuits are connected to said exchange and said wireless links are established between said units, said user, after observing the lamps to identify these outside lines which are free, can enter any number corresponding to any one of the free outside lines into the device in the handset unit in order to establish a communication channel between the outside line corresponding to the number entered and said handset unit.

2. The combination as set forth in claim 1 wherein said means provides a first dial tone differing from central office dial tone in the handset when the handset goes off hook and the central office provides central office dial tone in the handset when a communications channel is established between a free outside line and said handset.

3. The combination as set forth in claim 2 wherein said means responds to a specified minimum delay in dialing after central office dial tone has been heard in the handset to place the corresponding line on hold.

4. The combination as set forth in claim 3 wherein once the corresponding line is placed on hold the user can enter another number differing from that corresponding to the line on hold in the handset and ultimately establish a communication channel between the handset and the line corresponding to said another number.

5. The combination of claim 3 wherein when said on hold condition was established inadvertently the user must again enter said one number into the handset and then momentarily go on hook to release the held line.

6. The combination as set forth in claim 1 wherein the lamp controlling circuits are at relatively low voltage and the signal lamps operate at substantially higher voltage, said combination including additional means connected between said lamp controlling circuits and the signal lamps to enable said lamp controlling circuits to control the operation of said lamps.

7. The combination as set forth in claim 6 wherein said additional means includes a plurality of relays equal in number to the plurality of signal lamps, each relay being connected to a corresponding signal lamp.

8. The combination of claim 1 wherein each outside line comprises ring and tip conductors and wherein each key telephone system corresponding output circuit comprises the ring and tip conductors of the corresponding line, a separate A conductor used for line hold operations in the system, an L conductor and a C conductor, said L and C conductors having the function of controlling the lamp in the push button associated with the corresponding outside line which is found in each of the key telephone instruments in the system.

9. The combination of claim 8 wherein the output terminals of said means are connected to the ring, tip and A conductors and said lamp controlling circuits are connected to said L and C conductors.

10. The combination of claim 9 wherein each of said L conductors is connected to a different one of said push button lamps and said C conductors are connected in common to all of said push button lamps.

* * * * *